US006887367B2

(12) United States Patent
Berg et al.

(10) Patent No.: US 6,887,367 B2
(45) Date of Patent: May 3, 2005

(54) PROCESS FOR THE COATING OF PASSIVATED METALLIC SURFACES OF COMPONENTS AND SUCH COATED COMPONENTS

(75) Inventors: Siegfried Berg, Königsbach-Stein (DE); Thomas Bolch, Abstatt (DE); Friedrich Auer, Delitzsch (DE)

(73) Assignees: Fraunhofer-Gesellschaft zur Forderung der Angewandten Forschung E.V. (DE); FEW Chemicals GmbH (DE)

( * ) Notice: Subject to any disclaimer, the term of this patent is extended or adjusted under 35 U.S.C. 154(b) by 224 days.

(21) Appl. No.: 10/192,307

(22) Filed: Jul. 10, 2002

(65) Prior Publication Data

US 2003/0027020 A1 Feb. 6, 2003

(30) Foreign Application Priority Data

Jul. 16, 2001 (DE) ........................................ 101 34 473

(51) Int. Cl.[7] ............................ C25D 5/48; B32B 15/04

(52) U.S. Cl. ....................... 205/220; 205/223; 205/705; 205/799; 427/299; 427/327; 427/372.2; 427/384; 427/397.7; 427/397.8; 427/409; 427/421; 427/430.1; 428/447; 428/450; 428/457

(58) Field of Search ................................ 205/220, 223, 205/705, 799; 427/299, 327, 372.2, 384, 397.7, 397.8, 409, 421, 430.1; 428/447, 450, 457

(56) References Cited

U.S. PATENT DOCUMENTS

| | | | | |
|---|---|---|---|---|
| 5,324,544 A | | 6/1994 | Spence et al. | 427/397 |
| 5,753,313 A | | 5/1998 | Tsai | 427/449 |
| 5,869,141 A | | 2/1999 | Blohowiak et al. | 427/309 |
| 6,033,495 A | * | 3/2000 | McGowan et al. | 427/397.7 |
| 6,162,498 A | | 12/2000 | Mennig et al. | 427/226 |

FOREIGN PATENT DOCUMENTS

| | | |
|---|---|---|
| CA | 2327312 | 10/1999 |
| CN | 1077144a | 10/1993 |
| DE | 24 46 279 | 1/1976 |
| DE | 19714 949 | 10/1998 |
| DE | 19816 136 | 10/1999 |
| DE | 19857 317 | 6/2000 |
| DE | 19961 632 | 6/2001 |
| DE | 100 04 132 | 8/2001 |
| JP | 06145600 A | 5/1994 |
| JP | 06145946 A | 5/1994 |
| JP | 08299301 | 5/1998 |
| JP | 11052106 | 9/2000 |
| WO | WO 92/21729 | 12/1992 |
| WO | WO 97/01599 | 1/1997 |
| WO | WO 97/20005 | 6/1997 |
| WO | WO97/20005 | 6/1997 |
| WO | WO 98/42886 | 10/1998 |
| WO | WO 00/36034 | 6/2000 |
| WO | WO 00/63312 | 10/2000 |
| WO | WO 01/44381 | 6/2001 |

OTHER PUBLICATIONS

European Search Report dated Nov. 26, 2002.

* cited by examiner

*Primary Examiner*—Robert R. Koehler
(74) *Attorney, Agent, or Firm*—Young & Basile, P.C.

(57) ABSTRACT

The invention relates to a process which is suitable for applying a permanently adhering, stable, dirt and water repellent coating to metallic surfaces, specifically chromium surfaces, specifically sanitary and kitchen fixtures, and also to the components coated in this manner. The process is based on first chemically activating the surface and then coating it by means of a sol.

15 Claims, No Drawings

PROCESS FOR THE COATING OF PASSIVATED METALLIC SURFACES OF COMPONENTS AND SUCH COATED COMPONENTS

BACKGROUND OF THE INVENTION

The invention relates to a process which is suitable for applying a permanently adhering, stable, dirt and water-repellent coating to metallic surfaces, specifically chromium surfaces, specifically on sanitary and kitchen fixtures, as well as components coated in this manner.

Water fixtures in the sanitary field are generally in frequent use every day and are always in the direct view of the user. For these two reasons they have to be cleaned regularly, since contaminants on the surface such as calcium around edges, leftover dirt, cream, soap, toothpaste, etc. and fingerprints spoil the visual impression. In addition to the substantial expenditure of labor, regular cleaning is accompanied by the use of environmentally polluting cleaning agents and mechanical stress on the surface of the fixtures from the use of abrasive cleaners. The visually immaculate impression of a newly cleaned fixture is usually lost at the next subsequent use.

Modern decorative surfaces (as for example, in the sanitary field) are distinguished by the fact that they demonstrate multi-functional coating properties in addition to their decorative appeal. For example, among these functional coating properties are the anti-adhesive characteristics of surfaces. Surfaces of this type possess great resistance to being further covered, for example, by dirt particles or paints. Because of the anti-adhesive character of these surfaces, these coatings also have low sensitivity to fingerprints which can occur during production, installation or in the daily use of sanitary fixtures. Since anti-adhesive surfaces have a hydrophobic character, these coatings usually possess higher resistance to corrosion.

Anti-adhesive, dirt-repellent properties can be achieved, for example, by coating a galvanically chrome-plated surface (e.g. a bath fixture) with an anti-adhesive coating (e.g. a sol-gel coat). The integrity of these coating systems is, in addition to the properties of the coat, fundamentally dependent on the adhesion of the coat to the chromium surface. Since the chromium surface is present in very different, or non-defined, states as a result of production restraints, no process is currently known that is suitable for applying a sol-gel system to adhere firmly to a chromium surface.

The structure of a galvanically deposited chromium coat consists of a copper base coat, a nickel intermediate coat and a chromium top coat. These coats are applied galvanically one after the other. These production steps are supplemented by numerous activation and rinse treatments between the individual coating steps. The condition of the surface obtained by the coating is therefore a function resulting both from the physical and chemical properties of the coating material as well from the type of coating chemicals employed.

If a newly deposited chromium surface is exposed to normal atmosphere, a closed, passivating chromium oxide layer of several layers of atoms forms on the surface of the chromium coat. This oxide layer prevents further oxidation of the chromium underneath it and is one of the causes of poorer wetting characteristics with respect to high-polar liquids, so that normally problems arise regarding wetting and adhesion strength when a chromium surface undergoes additional coating. Thus water on a smooth, galvanically deposited chromium coat has a wetting angle of 90°, a typical value for hydrophobic surfaces, which do not permit wetting by media with polar groups.

Currently, two primary concepts are pursued in the production of surfaces having a dirt-repellent action:

Firstly, the application of a surface coating whose outermost surface has the lowest possible surface tension and thus a minimal tendency for contaminants to adhere.

Secondly, texturing the surface with peaks and valleys in the millimicron and micron range which result in water beading easily, whereby any contaminant can be removed using water ("lotus effect").

Because of the texture, the latter concept does not permit smooth, shiny surfaces, such as have been widespread in metal fixtures for decades and are expected by customers. The micro-structures described are additionally not very stable mechanically, as a result of which a gradual deterioration in the dirt-repellent effect can be expected. For these reasons, the former concept was pursued in the present invention.

The coating materials under consideration here are on the one hand conventional organic paints with surface tension-reducing additives such as silicon, on the other fluoro-organically functionalized sol-gel coatings and additionally perfluorinated polymers such as poly(tetrafluoroethylene).

The first-named coating materials generally have to be applied at a relatively high film thickness (30 to several hundred microns), they are mostly of limited chemical and mechanical stability and generally do not have extremely low surface tension, so that no decisive reduction in sensitivity to dirt is achieved compared with chromium.

The perfluoropolymers mentioned also have to be applied at a high film thickness (mostly more than 100 microns). Working against the advantages of high chemical stability and their pronounced anti-adhesive action are the additional disadvantages that the formation of a closed coat after the application of the polymer dispersion does not take place until very high temperatures (about 300° C. and higher), that the mechanical hardness of the coats is low and that for the most part transparent coats are not achieved, but only dull ones.

One process for producing mechanically stable and highly anti-adhesive surfaces, which is described many times over in the patent literature (e.g. in WO 9842886, U.S. Pat. No. 5,753,313, CN 1077144), lies in two-coat systems, consisting of a thermally sprayed (or electric-arc sprayed) ceramic or metallic coat and a subsequently applied coat of silicon resin or, better, fluoropolymer, which both covers the surface of the sprayed coat and also fills its valleys and pores. This process is costly overall, since it contains two expensive coating steps involving completely different technologies and is reserved for temperature-stable substrates because of the heat of the spray material and the high spraying temperatures for the polymer resins. Furthermore, the result is textured, non-transparent surfaces.

Polysiloxanes produced by the sol-gel process are also used as the base coat between the substrate and the fluoropolymer(JP 06145946). As a result, the temperature stress is certainly less when the base coat is applied, but the mechanical sensitivity of the overlying polymer resin is not improved thereby, and the adhesion of the sol-gel coat (and consequently of the entire composite coat) on substrates such as chromium is inadequate.

As an alternative, a perfluoropolymer phase in the form of an IPN (interpenetrating network) or a nanocomposite with a different polymer, e.g. a polysiloxane (as disclosed in WO 9701599) can be applied. Materials of this kind lead one to expect good coverage of the substrate on account of low surface tension, but the problem of adhesion on a smooth surface, e.g. of chromium, is similarly still not solved thereby.

Sol-gel coatings possess the advantage of forming stable, transparent coats even at clearly lesser film thicknesses (1–10 microns). This consumes less coating material, and detracts minimally from the external appearance of the coating on the article. The crosslinking of coats of this type takes places at temperatures as low as between 100° C. and 150° C., reducing energy consumption and also allowing thermally sensitive substrates (e.g. galvanically chrome-plated plastics) to be coated without damage. Because of their high degree of cross-linking these coats possess a mechanical stability which is superior to that of organic materials. The high inorganic content in compounds of this type also results in high stability against chemical attack and high temperatures. The stable incorporation of perfluoro-organic groups into the surface of a coating of this type results in surface tensions which are still lower than those of current perfluorinated polymers (about 18 mN/m), although the percentage by mass of the perfluoro chemicals in the overall mixture is very much lower.

These types of systems of fluoro-organic functionalized nanoparticle sol coatings are known from numerous patents, such as DE 2446279, JP 06145600, WO 92/21729, DE 19917367, DE 10004132.

Because of the properties profile described, sol-gel coatings of this type seem perfect for creating dirt and water-repellent coatings on sanitary fixtures, specifically chrome-plated sanitary fixtures, since a powerful anti-stick effect can be achieved without the loss of the beneficial properties of the metallic surfaces. The previously unsolved problem in this problem was the too low surface tension of galvanically created chromium surfaces which resulted in poor wetting and too weak adhesion.

SUMMARY OF THE INVENTION

With this as the point of departure, it was the object of the present invention to prepare a process for coating passivated metallic surfaces of components, where the adhesive strength of the coating is given priority. A further object of the present invention was the preparation of components coated in this way.

Under the invention a process for coating passivated metallic surfaces of components is prepared, based on the following steps:

1a) Chemical activation of the passivated surface by means of a solution containing surfactants and/or Ib) chemical activation of the passivated surface by reduction with a reducing agent or direct current and/or Ic) physical activation of the passivated surface by means of the sputter process and I) coating of the activated surface with at least one sol and formation of a gel.

The alternative activation steps 1a), 1b) and Ic) with which the metallic surface is modified are necessary to improve the wetting characteristics of the surface and to make possible a firmly adhering coating with sol-gel systems. The modification of the metallic surface results in a defined surface condition which is distinguished by the fact that the surface has a higher surface energy and thereby allows better adhesion of the sol-gel systems on the surface.

Chemical treatment of the metallic surface represents one possibility for activation. For this, treatment with an aqueous surfactant solution is carried out, as a result of which there is a change in the energy state of the metallic surface.

Since the formation of chemically stable oxides plays a key role in the passivation of the metallic surfaces, redox processes, specifically reduction reactions, are suitable alternatives for stopping or reducing the passivation of the surface, at least temporarily. A reduction of this kind can take place directly by applying negative potential to the metallic article, or alternatively by bringing the metallic article into contact with a base metal (for example, zinc, magnesium, or even aluminum) in an aqueous solution, whereby a local element with negative potential forms on the article to be coated, which element results in rapid reduction of the component's surface.

Another version is based on a physical activation of the surface. For this, the metallic surface is evacuated in a vacuum chamber and subjected to plasma treatment. The components are evacuated in a vacuum chamber and heated to a temperature that is substrate-dependent, with the heating normally taking place in an inert atmosphere. When a specific temperature is reached, a glow discharge is ignited, which is induced by applying a direct current between component and recipient wall so that ionized types of gas are accelerated in the direction of the component and collide with the surface of the components. The activation of the surface results from the cascade of impulses which the gas particles trigger and which thereby remove oxides and contaminants adhering to the surface (sputter).

In this context passivated surface can also be understood to mean a surface which is only partially passivated, and also an at least partially passivated surface.

A dirt and water-repellent sol-gel coating system which demonstrates good adhesion strength is then applied to the activated and modified metallic surface in the following step.

In contrast to the metallic surfaces described in the prior art, the low surface tension of the metallic surfaces coated with the sol-gel system in accordance with the present invention prevents or minimizes the most varied contaminants from adhering. If remnants do remain on the surface, they can usually be removed by simply rinsing with water. The result of this is a significant reduction in labor spent in cleaning, as well as savings on, or completely dispensing with environmentally polluting cleaning agents. As a result of the drastically reduced mechanical effort expended cleaning the surface of the fixture is preserved and the visually immaculate condition remains intact longer.

A further decisive advantage lies in improved hygiene, since it is made more difficult for micro-organisms to adhere and they cannot develop in the absence of water on the surface in question. The last-named advantage is of central importance in the case of fixtures used in the medical field, for example, in clinics. A further advantage of the invention lies in the corrosion protection effect of the coat, or of the coating system respectively, as a result of its high chemical stability and its high electrical resistance. In what follows, the terms coating and coating system are used synonymously. The formation of local elements with other metals is thereby just as effectively avoided as chemical attack by corrosive gases such as oxygen and $S0_2$, which are completely unable to penetrate to the actual metallic surface. In the event of mechanical damage to the coat down to the substrate, the worst that happens is corrosion at the damage site, but not corrosion under the surrounding coat, since the coating has a stable bond with the metallic surface.

In the case of the coating of finely textured metallic surfaces (for example, micro-textured chromium or polished steel), which have been widespread in the sanitary field for years, the invention shows a further positive effect. Contaminants such as sweat from hands settle preferably in the valleys of these types of surface and remain visible as a consequence of the changed reflection characteristics at this spot ("fingerprint effect"). Fingerprints of this kind are almost impossible to remove mechanically, but only by employing cleaning agents. Through the present invention it is much more difficult for sweat from hands to adhere in the valleys of the surface, and consequently the unsightly fingerprint effect is significantly reduced or even eliminated completely.

A particular advantage of the present invention lies in the fact that closed, anti-adhesive coats with very low film thicknesses (1 micron and less) can be applied, so that the texture of such finely textured surfaces—and thus visual appearance and tactile feel—is not altered substantially.

If the order of magnitude of a texturing which is applied for decorative purposes to the metallic surface (as for example in the case of micro-textured chromium or polished steel) lies in the range of micro-structures, this is done exclusively for decorative purposes and not to achieve a self-cleaning effect. In the present invention the dirt-repellent effect is created by means of chemical functionalizing, the use of the lotus effect to achieve a self-cleaning effect is expressly not the subject of this invention.

Preferably the process under the invention is carried out in such a way that as a result of the activation in steps 1a) and/or 1b) and/or Ic) the surface energy of the metallic surfaces is increased to values>40 mN/m and particularly preferably >50 mN/m. In this way the defect-free and permanently adhering coating of the metallic surface is made possible.

DETAILED DESCRIPTION OF THE PREFERRED EMBODIMENT

In a preferred version of chemical activation, direct current is applied to the galvanically coated component, as a result of which, when suitable surfactant solutions are used, the energy state of the chromium surface is changed such that the adhesive strength of sol-gel coats on this surface is enormously improved.

Simultaneously, as a result of the applied potential it becomes possible to change the oxidation state of oxidated metallic surfaces in such a way that the hydrophily of the surface can be increased.

Physical activation, i.e. the sputter process is preferably carried out in a hydrogen-nitrogen-argon atmosphere.

The coating of the surface that follows activation is preferably performed starting with silanes capable of hydrolysis, which are placed in a solvent and hydrolyzed with water and a catalyst. The resulting silanol groups subsequently condense among each other while forming siloxane bonds, as a result of which polysiloxane particles form dispersed in solution. By employing different functional silanes the resulting polysiloxane particles can be functionalized in practically any way whatsoever. Alkyl and amyl group functionalized silanes are suitable for the production of hydrophobic particles and thus hydrophobic coats, while with reactive groups functionalized silanes make possible on the one hand an optimal adhesion of the coat on the substrate and on the other hand cross-linking of the particles by means of the reactive groups. Using condemnable compounds of elements that can be condensed other than silicon, which similarly form oxide networks (as for example, B, Al, Ti, Zr, P, Ge, Sn, etc.), opens up additional possibilities for modifying the sol particles and the coats resulting from them. The incorporation of nanoscale oxide particles (e.g. Si02, A1203, etc.) into sol-gel systems results in so-called nanocomposites, which possess an even greater mechanical stability than pure polysiloxane coats.

In a preferred variation the coating system is formed from at least one sol containing cross-linkable fluoro-organically functionalized compounds. They result in a powerfully anti-adhesive surface effect in the resulting layers, which results from the minimal surface energy of perfluoro-organyl groups and from their concentration at the coating surface during the coating process.

In a preferred embodiment of the process the minimum of one sol is cross-linked at temperatures between 50 and 250° C., and particularly preferably between 100 and 200° C.

Preferably smooth or textured chromium, VA (stainless steel), nickel and/or aluminum surfaces are the metallic surfaces for the coating.

Under the invention a component is also prepared having a dirt and/or water-repellant sol-gel coating on the metallic surface, which was produced in accordance with the inventive process. The coating on the surface in question has a cross-hatch adhesion of GtO. (The term GtO refers to the mid section test according to DIN 53151 (DIN=German Industrial Norm) and is the best possible mark in view of the grid.)

It is preferred that the coating of the component is transparent and crack-free. It is possible to ensure the adhesion strength of the coating only by means of pre-treatment of the surface in accordance with the invention.

In a preferred embodiment the surface of the component has a wetting angle of water of >100° and particularly preferably 105°.

The process for coating finds an application principally in the area of sanitary and kitchen fixtures. Fixtures in these areas have mostly metallic surfaces which are widely exposed to contamination by hard-to-remove media, such as oil vapor, spraying fat, salt water, egg yolk. The process also finds an application for other household items having metallic surfaces. Commercial areas come to mind, for example, restaurants, hotels, clinics, public toilets. Here it has been necessary until now to clean the fixtures daily or even more frequently. With the solution from the invention the time spent in cleaning can be reduced considerably, which results in a substantial reduction in costs over a period of several years of use, which is not outweighed by the cost of the coating.

With reference to the following examples, the process in accordance with the invention will be explained in greater detail without restricting it to the individual examples.

Example 1

In an Erlemneyer flask 150 ml of 2-propanol, isopropyl alcohol, 50 ml I-methoxy-2-propanol, isopropyl alcohol, 25 ml of tetraethoxysilane (TEOS), 25 ml of phenyltriethoxysilane and 25 ml of trifluoroacetic acid 0. 1 N are mixed while being stirred. After two days, 5.5 ml of a I-percent by weight solution of bis(triethoxysilyl)-functionalized perfluoropolyether (trade name "Fluorolink S10") are stirred into 2-propanol, isopropyl. alcohol. After one more day the fluoro-functionalized polysiloxane sol is ready for use.

Example 2

Sol from example 1 is applied to a galvanically chrome-plated fixture surround by flooding. After evaporation of the solvent, the coating system is heat-cured (150° C., 1 hour). Even during the coating process wetting problems occur, i.e. the initially closed film on the metallic surface splits open in several places. After curing the result is a transparent coating with numerous defective areas, which definitely shows excellent anti-adhesive effect but which can be torn off completely by a strip of adhesive tape applied to it.

Example 3

Sol from example 1 is applied as a coat, similar to example 2, on a galvanically chrome-plated metal test panel (size 60×100 mm). A cross-hatch cut is made on the coated surface and the panel is then exposed to a humid climate at 40° C. (100% humidity, DIN 50017). After four days extensive peeling of the coat can be observed.

Example 4

A galvanically chrome-plated, metal test panel (size 60×100 mm) has a water wetting angle of 90°. This panel is immersed for 5 minutes at 7° C. in an alkaline silicate solution, then rinsed with distilled water and dried with compressed air. A second determination of the wetting angle of water following the treatment shows a value of 30°.

Example 5

Similarly to example 4, a galvanically chrome-plated metal test panel (size 60×100 mm) is immersed for 30 minutes at 80° C. in an alkaline silicate solution, then rinsed with distilled water and dried with compressed air. A determination of the wetting angle of water following the treatment shows a value of 22°.

Example 6

A galvanically chrome-plated test panel is immersed for 5 minutes at 70° C. in an alkaline silicate solution and electrolytically cleaned by applying direct current, then cleaned with distilled water and dried with compressed air. A determination of the wetting angle of water after the treatment shows a value of 29°.

Example 7

Similar to example 4, a galvanically chrome-plated metal test panel (size 60×100 mm) is immersed for 5 minutes in a warm 70° C. alkaline silicate solution such that it comes into contact with zinc granules in the solution, then it is rinsed with distilled water and dried using compressed air. A determination of the wetting angle of water immediately after the treatment shows a value of 13°, one hour later the value is still 21°.

Example 8

A galvanically chrome-plated metal test panel is cleaned in a hydrogen-nitrogen-argon atmosphere by igniting a glow discharge between the panel and the reactor wall by applying direct current. A determination of the wetting angle of water following the treatment shows a value of 43°.

Example 9

In an Erlenmeyer flask 100 ml of ethanol, 25 ml of glycidoxypropyltrimethoxysilane ("GLYMO") and 25 ml 0.1 N hydrochloric acid are mixed while being stirred. In another Erlenmeyer flask 100 ml of ethanol, 25 ml aminopropyltriethoxysilane and 25 ml of water are mixed while being stirred. After three days 50 ml of the first sol is stirred into 100 ml of the second sol. The mixture is ready for use after being stirred for 30 minutes and sprayable after about 2 days.

Example 10

A test panel treated as in example 4 is coated with the sol mixture from example 9 by flooding and subsequently heat-cured for 1 hour at 150° C. The result is a closed adhesion coat without any wetting problems, which has a cross-hatch adhesion of GtO. A coat of sol from example 1 is applied to this adhesion coat and subsequently heat-cured for 1 hour at 150° C. The resulting two-coat system has a cross-hatch adhesion of GtO. On this surface water has a wetting angle of 109° and hexadecane an angle of 62°. Even after 28 days in a humid climate (40° C., 100% relative humidity) no peeling of the coats is observed, the adhesion value continues to be GtO.

Example 11

A galvanically chrome-plated bath fixture trim plate is pre-treated similar to example 4 and then cut apart. One part of the trim plate treated in this way is kept for three days in an $S0_2$ climate (DIN 500 18). There is no external change in the coated surface. Then a cross-cut is made on the coated surface down to the substrate and the $S0_2$ test is continued for two more days. Only brown tarnishing is observed at the site of the cut, there is no infiltration of the coat. The coated surface remains visually unchanged, while the uncoated reverse side is completely corroded.

Example 12

Another part of the coated trim from example 11 is subjected to an abrasion test with cleaners (crock test). After 100,000 cycles no abrasion down to the substrate can be detected.

Example 13

A wash stand fixture is pre-treated in a similar way to example 4 and coated in a similar way to example 11 with an adhesion coat and an anti-adhesive top coat, in this case not by flooding but by spray coating with an HVLP spray gun. Subsequently it is installed in a heavily utilized factory washroom. After 6 months of use the repellent property of the surface is still intact, no cracking or creep can be detected in the coating.

Example 14

Metal test panel treated as in example 6 is coated in a similar way to example 10 with adhesion coat and anti-adhesive top coat. The wetting angle of water and hexadecane is 108° or 61° respectively, the two-coat system has a cross-hatch adhesion of GtO, after 28 days in a humid climate (40° C., 100% humidity) no peeling of the coats is observed, the adhesion value remains at GtO.

Example 15

Test panel treated as in example 8 is coated in a similar way to example 10 with adhesion coat and anti-adhesive top coat. The wetting angle of water and hexadecane are 108° and 6° respectively, the two-coat system has a crosshatch adhesion of GtO, after 28 days in a humid climate (40° C., 100% humidity) no peeling of the coats is observed, the adhesion value remains at GtO.

What is claimed is:

1. Process for coating passivated metallic surfaces of components comprising the following steps:

Ia) chemical activation of the passivated surface using a solution containing surfactants and/or Ib) chemical activation of the passivated surface by reduction with a reducing agent or direct current and/or Ic) physical activation of the passivated surface using the sputter method and II) coating the activated surface with at least one sol and formation of a gel, wherein direct current is additionally applied to the component during chemical activation.

2. Process from claim 1, wherein the surface energy is increased by activation to values higher than 40 mN/m, preferably to higher than 50 n-N/m.

3. Process from claim 1, wherein the sputter process is carried out during the physical activation in a hydrogen-nitrogen-argon atmosphere.

4. Process from claim 1, wherein the coating system is formed completely or partially from at least one sol containing siloxane.

5. Process from claim 1, wherein the coating system is formed completely or partially from at least one cross-linkable sol containing fluoro-organically functionalized compounds.

6. Process from claim 1, wherein at least one sol is cross-linked at temperatures between 50 and 250° C., preferably between 100 and 200° C.

7. Process from claim 1, wherein a surface consisting of smooth or textured chromium, nickel, and/or aluminum is coated.

8. Component having a dirt and water-repellent sol-gel coating on the metallic surface, which was produced using the process in accordance with claim 1, characterized in that the coating has a cross-hatch adhesion of Gt0.

9. Component from claim 8, wherein the coated surface consists of smooth or textured chromium, steel, nickel and/or aluminum.

10. Component from claim 8, wherein the coating is transparent and free of cracks.

11. Component from claim 8, wherein the wetting angle of water on the coated surface is higher than 100°, preferably higher than 105°.

12. Component from claim 8, wherein the coating system consists entirely or partially of at least one sol containing siloxane.

13. Component from claim 8, wherein the coating system consists entirely or partially of at least one sol containing cross-linkable fluor-organically functionalized compounds.

14. Process for coating passivated metallic surfaces of sanitary and kitchen fixtures comprising the steps of:

activating the passivated surface by at least one of (a) chemical activation by using a solution containing surfacants; (b) chemical activation by reduction with a reducing agent or direct current; and (c) physical activation by using the sputter method; and coating the activated surface with at least one sol and formation of a gel, wherein direct current is additionally applied to the fixture during chemical activation.

15. Process for coating passivated metallic surfaces of household appliances comprising the steps of: activating the passivated surface by at least one of (a) chemical activation by using a solution containing surfacants; (b) chemical activation by reduction with a reducing agent or direct current; and (c) physical activation by using the sputter method; and coating the activated surface with at least one sol and formation of a gel, wherein direct current is additionally applied to the appliance during chemical activation.

* * * * *